Dec. 28, 1965  J. D. ELLIS  3,226,138
FLARED END TUBE FITTING
Filed Dec. 7, 1961
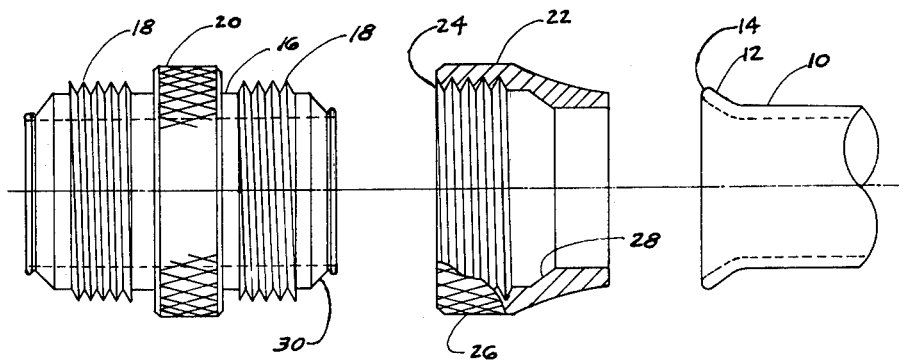
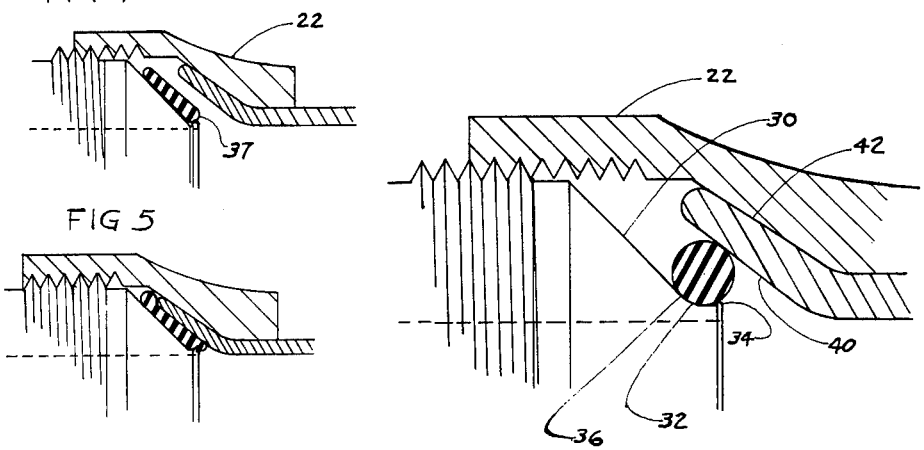
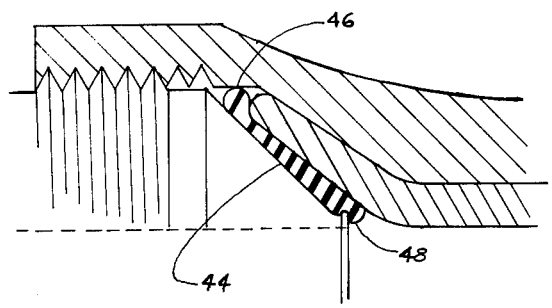
INVENTOR.
JOHN DEAN ELLIS
BY
HERBERT C. SCHULZE
ATTORNEY

United States Patent Office 3,226,138
Patented Dec. 28, 1965

3,226,138
FLARED END TUBE FITTING
John Dean Ellis, 702 W. Colton Ave.,
Redlands, Calif.
Filed Dec. 7, 1961, Ser. No. 157,642
3 Claims. (Cl. 285—332.3)

This invention relates to an improved flared end tubular fitting which will increase fluid tight seal effectiveness in response to a build-up of fluid pressure within the connection.

One of the objects of the invention is in the provision of a fluid type connection between a flared end tube and fitting adapted to be coupled thereto.

Another object of the invention is to provide a flared end tube fitting having a deformable O-ring or preformed gasket that responds to increases in fluid pressure to increase sealing effectiveness.

Yet another object of the invention is to provide a connection between the flared tube and fitting in which the concentric gasket is deformed between and about the converging surfaces in direct response and sealing effectiveness to increase a fluid pressure within the connections.

Still another object of the invention is to provide a flared end tubular fitting in which the sealing operation draws the tube and fitting to positions of spaced but co-inciding interior diameters to prevent turbulence or pressure drops in the fluid or gases being used especially at high flow rates.

A further object of the invention is in the provision of a gasket sealing means between converging surfaces of the fitting and flared end tube whereby their interior diameters coincide in spaced relationship either exactly or within a limit of plus or minus five thousandths of an inch.

The foregoing and other objects and advantages of this invention will be clear to those skilled in the art upon reading the following specification in conjunction with the attached drawings in which:

FIGURE 1 is an elevational view partly in section of the component parts of my flared end tube fitting showing the parts in disassembled relationship;

FIGURE 2 is a fragmentary sectional view showing the parts of FIGURE 1 broken away and in initial assembly;

FIGURE 3 is a fragmentary sectional view of the parts of FIGURE 1 in connected relationship;

FIGURE 4 is a fragmentary sectional view showing the parts of FIGURE 1 broken away and in initial assembly with a preformed gasket; and FIGURE 5 is a fragmentary sectional view of the parts of FIGURE 4 in connected relationship.

The improved flared end tube fitting forming a preferred embodiment of the invention is adapted to be used with hydraulic or pneumatic fluid lines carrying fluid under high pressure and varying conditions of use such as are found in air craft and guided missiles or the like. It is essential that the fitting provide a connection capable of handling various fluids. The connection must remain fluid tight under any and all conditions of use.

It is essential that the connection between the flared end tube and fitting be constructed and arranged to withstand and increase sealing effectiveness upon unusual build-ups of fluid pressure therein.

Referring to the drawings, an end portion of a conventional tube 10 is flared outwardly at 12. The flared end 12 tapers slightly in thickness during the conventional flaring operation. The slightly diminished end 12 of the tube 10 has a curved outer end 14 to prevent splitting of the tube.

A tubular fitting 16 is adapted to be coupled with the flared end 12 of the tube 10. The fitting 16 has opposite ends adapted to be coupled with flared end tubes such as 10. The fitting may be single or double depending on the type of piping system.

The fitting 16 is externally threaded at 18 on either end. A knurled intermediate portion 20 is adapted to be engaged by a wrench for the coupling operation. A coupling nut 22, as shown in FIGURE 1, is internally threaded at 24. The nut 22 is adapted to be threaded upon the externally threaded portion 18 of the fitting 16. The nut 22 has a knurled exterior 26 adapted to be rotated by a suitable tool during the coupling operation.

The nut 22 has an internally beveled shoulder 28 which is adapted to engage the outer flared side of the tube end 12 as shown in FIGURE 2. The inner and outer ends of the fitting 16 have externally beveled surfaces 30. The beveled or frusto-conical surfaces 30 terminate in a gradual curve 32 that forms a slightly arcuate seat 34 for a deformable O-ring 36 or a preformed gasket 37 of a conventional sealing material such as "Teflon" Fiberglas combination. The O-ring 36 or gasket 37 in the drawings during the initial coupling operation are concentrically arranged on the seat 34. The gasket engages the opposed beveled surfaces uniformly and concentrically and makes a tight seal throughout the circumference of the ring.

It is intended that the arrangement of the parts be such that the interior diameter of the fitting and the exterior diameter of the tube coincide exactly or within a limit of plus or minus five one thousandths of an inch. The purpose of the coinciding arrangement is to prevent turbulence or pressure drops in the fluid or gases being used especially at high flow rates.

The gasket, when initially disposed on the seat 34 in FIGURE 2, overhangs slightly the inner end 38 of the fitting 16. The ring 36 or gasket 37 opposes contact of the beveled face 30 of the fitting and the flared end of the tube 10. The O-ring 36 or gasket 37 holds the opposed metal surfaces apart at all times.

The inner beveled coniform face 40 of the tube flared end 12 and the outer beveled coniform surface 30 of the fitting 16 are not disposed in a parallel relationship. They tend to converge outwardly. The inner beveled coniform face 40 of the tube 10 is formed on an angle of 37°. The outer beveled coniform face 30 of the fitting 16 is formed on an angle of 45°. The outer flared surface 42 of the tube end 12 slopes outwardly at an angle of 33°. The angular formation of the beveled metal surfaces may be varied to some extent but it is essential that the beveled faces 30 and 40 be prevented from direct metal contact.

The slightly converging metal surfaces 30 and 40 separated by the concentrically seated O-ring 36 or gasket 37 are shown in initial position of connecting and sealing arrangement in FIGURES 2 and 3, the coupling nut 22 is tightened upon the fitting 16 and the deformable O-ring 36 is compressed and flows between the converging opposed surfaces 30 and 40. The diameter of the O-ring 36 is such as to form a compressed sealing mass 44 that prevents any metal to metal contact of the beveled surface areas of the tube 10 and fitting 16. The preformed gasket 37 will flow under pressure outwardly and inwardly as does the O-ring 36.

The slightly converging surface areas in the connecting and sealing operation compress the O-ring at 46 outwardly and around the curved end 14 of the flared tube 12. At the same time the deformed end 48 of the ring 36 flows inwardly between the inner end 38 of the fitting 16 and the sloping surface 40 of the flared tube 12. The inner edge corner of the coniform face 40 is rounded to prevent any damage to the gasket material. Fluid pressure within the lines forces the flowing seal tightly between the converging surfaces and around the outer end of the tube 12. Increasing fluid pressures also force the sealing material between the approaching surfaces of the flared tube and fitting inner end 48.

Irrespective of pressure forces, whether initially applied or due to build-ups within the piping system, there is no possibility that the converging surfaces 30 and 40 might make metal to metal contact. The arrangement of the elements and disposition of the O-ring and gasket 37 as they are deformed tends to increase and expand the sealing means under any conditions. Increased pressures applied to the sealing material by the converging outer metal surfaces also extends inwardly to expand the seal within the tubular area.

While the embodiment of this invention as shown and described is fully capable of performing the objects and achieving the advantages desired, many modifications will be clear to those skilled in the art without departing from the inventive concepts herein disclosed. It is not my intention to be limited by the specific embodiment shown and described which has been shown and described for illustrative purposes only.

I claim:

1. In combination, a tubular fluid connection comprising a fitting body having an end portion comprising an external, substantially right circular, frusto-conical surface; said end portion terminating with a substantially cylindrical extension joining the smaller end of said frusto-conical surface and being coaxial therewith; a fluid passageway in said fitting body coaxial with said frusto-conical surface and said cylindrical extension; a tube spaced from but adjacent to said fitting and having a passageway coaxial with and of substantially the same diameter as the fluid passageway through said fitting body thereby to provide an uninterrupted flow path for the fluid through the fluid connection; said tube including an outwardly flared end portion defining interior and exterior coniform end faces with at least said interior end face being flared at an angle converging toward said external frusto-conical surface on said fitting body; at least the inner edge corner of said end face of said flared tube being rounded; an annular extrudable resilient sealing gasket interposed between said converging interior coniform end face and said external frusto-conical surface; said gasket, in the free state, having an extent along said frusto-conical surface and said coniform surface substantially less than the extent of either said frusto-conical surface or said coniform surface; a coupling sleeve slidably encircling said tube and in threaded engagement with said fitting body; said sleeve including an inner cylindrical surface and a coniform surface in mating engagement with said exterior coniform end face on said tubing thereby to exert an axial force on said tube and compress said sealing gasket between said converging interior coniform end face and said external frusto-conical surface; said end face of said flared tube terminating radially inward of said cylindrical surface to provide therewith a gasket extrusion cavity; said gasket in its uncompressed state being radially spaced inwardly of said sleeve; said compressed sealing gasket extending over substantially the entire surface of said frusto-conical surface and said cylindrical extension and having portions thereof extending around said flared end portion of said tube and into said cavity and around the end of said cylindrical extension thereby to prevent any metal contact between said tube and said fitting body.

2. The fluid connection of claim 1 wherein said resilient sealing gasket is preformed to be in mating engagement with said frusto-conical surface and said cylindrical extension when uncompressed and means on said cylindrical extension cooperating with said gasket in its uncompressed state to maintain said gasket radially spaced above the fluid passage through said fitting body.

3. The fluid connection of claim 1 wherein said resilient sealing gasket is in the form of an O-ring when uncompressed and the juncture of said inner terminus of said frusto-conical surface and said cylindrical extension includes an arcuate seat adapted to receive said O-ring during the assembly of said fluid connection.

References Cited by the Examiner

UNITED STATES PATENTS 2,696,395  12/1954  Ellis _____ 285—332.3

FOREIGN PATENTS 560,349  7/1958  Canada.
1,047,939  7/1953  France.
416,523  9/1934  Great Britain.

CARL W. TOMLIN, *Primary Examiner.*